US009222629B2

(12) United States Patent
Ninan

(10) Patent No.: US 9,222,629 B2
(45) Date of Patent: Dec. 29, 2015

(54) N-MODULATION FOR WIDE COLOR GAMUT AND HIGH BRIGHTNESS

(75) Inventor: Ajit Ninan, San Jose, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 864 days.

(21) Appl. No.: 13/325,279

(22) Filed: Dec. 14, 2011

(65) Prior Publication Data

US 2012/0154422 A1 Jun. 21, 2012

Related U.S. Application Data

(60) Provisional application No. 61/424,199, filed on Dec. 17, 2010, provisional application No. 61/448,599, filed on Mar. 2, 2011, provisional application No. 61/486,160, filed on May 13, 2011, provisional application No. 61/486,166, filed on May 13, 2011, provisional application No. 61/486,171, filed on May 13, 2011.

(51) Int. Cl.
*G09G 3/02* (2006.01)
*G09G 5/14* (2006.01)
(Continued)

(52) U.S. Cl.
CPC ... *F21K 9/56* (2013.01); *F21V 9/08* (2013.01); *G02B 26/08* (2013.01); *G02B 27/2207* (2013.01); *G02B 27/2264* (2013.01); *G09G 3/001* (2013.01); *G09G 3/003* (2013.01);
(Continued)

(58) Field of Classification Search
CPC .............. H04L 27/322; H04L 27/3246; H04L 27/1214; H04L 29/66742; H04L 51/56; G09G 2310/0235; G09G 3/2003; G09G 3/3413; G09G 3/2022; G09G 5/02; G09G 2340/06; G02B 27/2207; G02B 27/2264; G02F 1/133608; G02F 1/133514; G02F 1/133555
USPC ........................................................ 345/589
See application file for complete search history.

(56) References Cited

U.S. PATENT DOCUMENTS 5,090,794 A 2/1992 Hatano
5,666,174 A 9/1997 Cupolo
(Continued)

FOREIGN PATENT DOCUMENTS

CA 2570090 6/2008
CN 1732717 2/2006
(Continued)

OTHER PUBLICATIONS

NanocoTechnologies "The Future of Cadmium Free QD Display Technology" Apr. 2011.
(Continued)

*Primary Examiner* — Mark Zimmerman
*Assistant Examiner* — F. M. Hossain

(57) ABSTRACT

Techniques are provided to support a high dynamic range, high brightness, a wide color gamut, and high resolution in an imaging system. The imaging system may use a light source unit to sequentially emit light of different colors. Color-specific frames may be used to drive, directly or indirectly, multiple display panels that comprise at least one monochromatic display panel. Color bleeding and light bleeding may be prevented, or otherwise mitigated, in the imaging system by controlling the sequential emission of light by the light source unit and by controlling display portions of the display panels in the imaging system.

30 Claims, 8 Drawing Sheets

(51) Int. Cl.
  *F21K 99/00* (2010.01)
  *G02B 27/22* (2006.01)
  *G09G 3/00* (2006.01)
  *F21V 9/08* (2006.01)
  *G02B 26/08* (2006.01)

(52) U.S. Cl.
  CPC .. *G09G3/02* (2013.01); *G09G 5/14* (2013.01); *G09G 2310/0235* (2013.01)

(56) References Cited

U.S. PATENT DOCUMENTS

| | | | |
|---|---|---|---|
| 5,731,794 | A | 3/1998 | Miyazawa |
| 5,754,159 | A | 5/1998 | Wood |
| 5,774,257 | A | 6/1998 | Shibata |
| 6,031,328 | A | 2/2000 | Nakamoto |
| 6,470,115 | B1 | 10/2002 | Yonekubo |
| 6,608,439 | B1 | 8/2003 | Sokolik |
| 6,817,717 | B2 | 11/2004 | Childers |
| 6,864,626 | B1 | 3/2005 | Weiss |
| 6,891,672 | B2 | 5/2005 | Whitehead |
| 7,018,046 | B2 | 3/2006 | Childers |
| 7,050,122 | B2 | 5/2006 | Gibbon |
| 7,092,137 | B2 | 8/2006 | Childers |
| 7,126,254 | B2 | 10/2006 | Nanataki |
| 7,224,335 | B2 | 5/2007 | Gibbon |
| 7,230,603 | B2 | 6/2007 | Yamamoto |
| 7,370,979 | B2 | 5/2008 | Whitehead |
| 7,391,475 | B2 | 6/2008 | Pate |
| 7,465,104 | B2 | 12/2008 | Tokui |
| 7,481,562 | B2 | 1/2009 | Chua |
| 7,486,854 | B2 | 2/2009 | Van Ostrand |
| 7,537,947 | B2 | 5/2009 | Smith |
| 7,551,341 | B1 | 6/2009 | Ward |
| 7,578,606 | B2 | 8/2009 | Whitehead |
| 7,583,331 | B2 | 9/2009 | Whitehead |
| 7,649,594 | B2 | 1/2010 | Kim |
| 7,686,493 | B2 | 3/2010 | Roshan |
| 7,696,684 | B2 | 4/2010 | Weiss |
| 7,733,017 | B2 | 6/2010 | Shapiro |
| 7,733,568 | B2 | 6/2010 | Silverstein |
| 7,746,423 | B2 | 6/2010 | Im |
| 7,747,098 | B2 | 6/2010 | Ward |
| 7,751,663 | B2 | 7/2010 | Van Ostrand |
| 7,768,023 | B2 | 8/2010 | Diana |
| 7,817,131 | B2 | 10/2010 | Seetzen |
| 7,858,409 | B2 | 12/2010 | Kessels |
| 7,982,812 | B2 | 7/2011 | Rho |
| 7,988,311 | B2 | 8/2011 | Helbing |
| 8,026,661 | B2 | 9/2011 | Weiss |
| 8,035,772 | B2 | 10/2011 | Kim |
| 8,075,148 | B2 | 12/2011 | Nada |
| 8,164,820 | B2 | 4/2012 | Cho |
| 8,174,546 | B2 | 5/2012 | Whitehead |
| 8,210,701 | B2 | 7/2012 | Igarashi |
| 8,215,815 | B2 | 7/2012 | Meir |
| 8,242,679 | B2 | 8/2012 | Noh |
| 8,289,270 | B2 | 10/2012 | Wallener |
| 8,294,168 | B2 | 10/2012 | Park |
| 8,471,807 | B2 | 6/2013 | Seetzen |
| 8,493,313 | B2 | 7/2013 | Damberg |
| 8,531,492 | B2 | 9/2013 | Wallener |
| 8,681,189 | B2 | 3/2014 | Wallener |
| 8,698,729 | B2 | 4/2014 | Ward |
| 8,786,643 | B2 | 7/2014 | Seetzen |
| 2004/0109145 | A1* | 6/2004 | Nishio et al. .............. 353/94 |
| 2006/0109682 | A1 | 5/2006 | Ko |
| 2006/0121371 | A1 | 6/2006 | Wu |
| 2006/0238103 | A1 | 10/2006 | Choi |
| 2006/0244367 | A1 | 11/2006 | Im |
| 2007/0029560 | A1 | 2/2007 | Su |
| 2007/0096141 | A1 | 5/2007 | Chen |
| 2007/0242028 | A1 | 10/2007 | Kitagawa |
| 2007/0268240 | A1 | 11/2007 | Lee |
| 2008/0007172 | A1 | 1/2008 | Tan |
| 2008/0255537 | A1 | 10/2008 | Voegele et al. |
| 2008/0284677 | A1 | 11/2008 | Whitehead |
| 2009/0039448 | A1 | 2/2009 | Chuang |
| 2009/0059554 | A1 | 3/2009 | Skipor |
| 2009/0091689 | A1 | 4/2009 | Rho |
| 2009/0146933 | A1 | 6/2009 | Visser |
| 2009/0162011 | A1 | 6/2009 | Coe-Sullivan |
| 2009/0180038 | A1* | 7/2009 | Sugimoto et al. .............. 348/759 |
| 2009/0180055 | A1 | 7/2009 | Kim |
| 2009/0194774 | A1 | 8/2009 | Huang |
| 2009/0196014 | A1 | 8/2009 | Hsiao |
| 2009/0231831 | A1 | 9/2009 | Hsiao |
| 2009/0303161 | A1 | 12/2009 | Messmer |
| 2009/0315921 | A1* | 12/2009 | Sakaigawa et al. ........... 345/694 |
| 2010/0084674 | A1 | 4/2010 | Paetzold |
| 2010/0102251 | A1 | 4/2010 | Ferrini |
| 2010/0102340 | A1 | 4/2010 | Ooya |
| 2010/0155749 | A1 | 6/2010 | Chen |
| 2010/0172138 | A1 | 7/2010 | Richardson |
| 2010/0177091 | A1 | 7/2010 | Hioki |
| 2010/0193806 | A1 | 8/2010 | Byun |
| 2010/0208172 | A1 | 8/2010 | Jang |
| 2010/0208493 | A1 | 8/2010 | Choi |
| 2010/0246160 | A1 | 9/2010 | Ito |
| 2010/0265281 | A1* | 10/2010 | Furukawa et al. ............ 345/691 |
| 2010/0283036 | A1 | 11/2010 | Coe-Sullivan |
| 2010/0283072 | A1 | 11/2010 | Kazlas |
| 2011/0193610 | A1 | 8/2011 | Longhurst |
| 2011/0299011 | A1 | 12/2011 | Weiss |
| 2011/0312116 | A1 | 12/2011 | Weiss |
| 2011/0317097 | A1 | 12/2011 | Kim |
| 2012/0050632 | A1 | 3/2012 | Shih |
| 2012/0154417 | A1 | 6/2012 | Ninan |
| 2012/0154422 | A1 | 6/2012 | Ninan |
| 2012/0154464 | A1 | 6/2012 | Ninan |
| 2012/0155060 | A1 | 6/2012 | Ninan |
| 2012/0274882 | A1 | 11/2012 | Jung |
| 2014/0002514 | A1 | 1/2014 | Richards |
| 2014/0029244 | A1 | 1/2014 | Whitehead |
| 2014/0168287 | A1 | 6/2014 | Wallener |

FOREIGN PATENT DOCUMENTS

| | | |
|---|---|---|
| CN | 101243557 | 8/2008 |
| CN | 101398549 | 4/2009 |
| CN | 101866624 A | 10/2010 |
| EP | 1579733 | 9/2005 |
| EP | 1922763 | 5/2008 |
| JP | 2004-325647 | 11/2004 |
| JP | 2009-251129 | 10/2009 |
| KR | 2000-014574 | 3/2000 |
| KR | 2002-045461 | 6/2000 |
| KR | 2007-024893 | 3/2007 |
| KR | 2008-0041780 | 5/2008 |
| KR | 2011-0012246 | 2/2011 |
| KR | 2011-0072210 | 6/2011 |
| KR | 2012-0078883 | 7/2012 |
| KR | 2013-0000506 | 1/2013 |
| WO | 2004/060024 | 7/2004 |
| WO | 2007/020556 | 2/2007 |
| WO | 2009/041594 | 4/2009 |
| WO | 2011/031802 | 3/2011 |

OTHER PUBLICATIONS

Quantum Dot LCD HDTV, Dec. 31, 2009.
Nanosys and LG Close to Bringing Quantun Dot Technology to LCD Displays, Nov. 4, 2010.
Green, Kate, "How Quantum Dots Will Make LCDs Better", Dec. 9, 2009, QD Vision.
Office Action of Chinese Patent Application No. 201110430245.4 mailed on May 18, 2015. 4 Pages.

* cited by examiner

N-MODULATION FOR WIDE COLOR GAMUT AND HIGH BRIGHTNESS

CROSS-REFERENCE TO RELATED APPLICATIONS

This application claims benefit of priority to related, U.S. Provisional Patent Application No. 61/424,199 filed on Dec. 17, 2010; U.S. Provisional Patent Application No. 61/448,599 filed on Mar. 2, 2011; U.S. Provisional Patent Application No. 61/486,160 filed on May 13, 2011; U.S. Provisional Patent Application No. 61/486,166 filed on May 13, 2011; and U.S. Provisional Patent Application No. 61/486,171 filed on May 13, 2011, which are hereby incorporated herein by reference for all purposes as if fully set forth herein.

TECHNOLOGY

The present invention relates generally to imaging systems, and in particular, to imaging systems of high dynamic ranges, high definition and/or wide color gamut.

BACKGROUND

Engineering wide color gamut and high luminance has been recognized as a very difficult endeavor by many display manufactures. Typically, a display panel may be illuminated by a light source in the back or from the front. To express colorful images, color filters that impart different colors may be used in a pixel in the display panel. Due to its inherent inefficient optical filtering, a color filter may block all but a very small percentage of the incident light. For example, as much as ninety six percent of the incident light may be wasted. This optical inefficiency associated with color filters may get worse if multiple color filters are used to accomplish a relatively precise color gamut by letting out only extremely narrow bands with highly specific colors in the light spectrum.

Additionally, a light source illuminates a surface in a spatial distribution characterized by a point spread function of the light source. Thus, a backlight unit (BLU) having one or more light sources may be of a (collective) point spread function as determined by individual point spread functions of the light sources in the BLU. Further, the BLU may be of a color profile contributed from a number of different types of LEDs in the light sources emitting different color lights. As these different types of LEDs emit light of most wavelengths for which display systems are not optimized, image inversions, restrictive viewing angles and undesirable color representations and tinges may occur in the display systems so that displayed images suffer from poor quality or limited color gamuts.

In these display systems, it is difficult for a pixel or subpixel to accurately express a single color, e.g., red, as the pixel or subpixel would be illuminated with light of different colors. For example, a subpixel in a pixel may be covered with a red filter to impart a red color, while other subpixels in the pixel may be covered with different color filters to impart different colors. Even though only a single color light is needed for the subpixel covered with the red filter, light of different colors from neighboring subpixels still illuminates and/or bleeds into that subpixel.

To reduce or remove the effect of color bleeding on a designated color, imaging systems may need to implement color compensation and correction. For example, red light may be made more intense in order to balance out any non-red color shift caused by the color bleeding (e.g., green and blue in a RGB display system). A red color subpixel may be produced in this way but the subpixel may contain a relatively high percentage of white light, causing a narrow color gamut for an imaging system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE POSSIBLE EMBODIMENTS

Figure 1B:
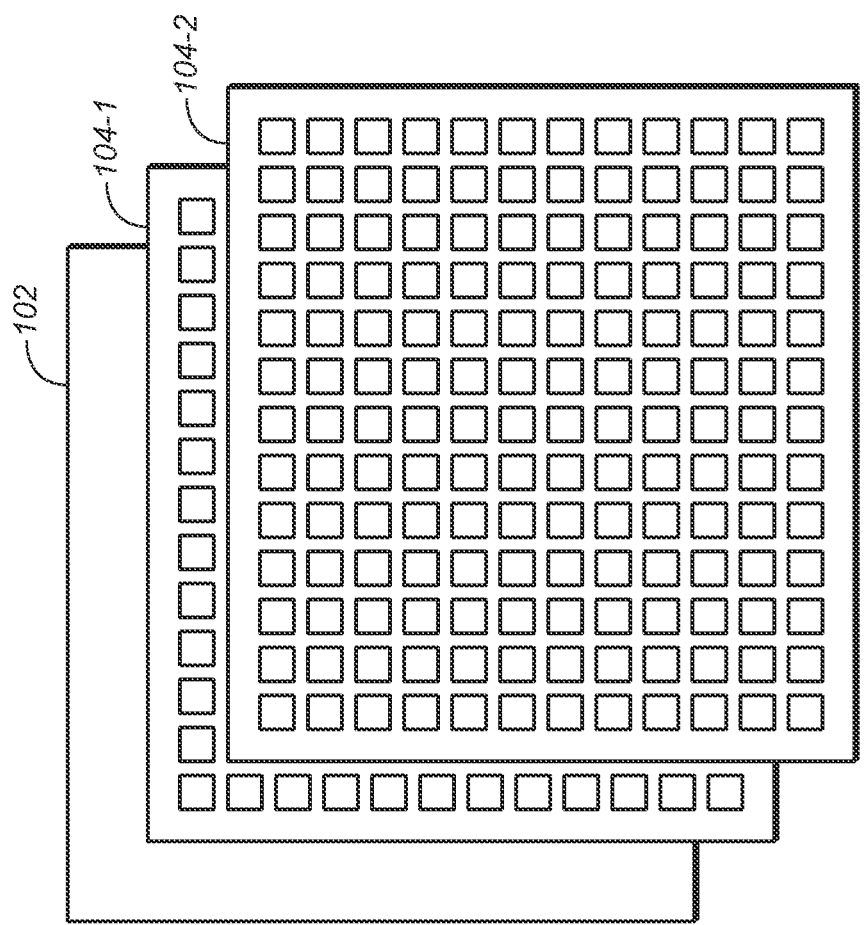
FIG. 1B illustrates an example view of a display unit (e.g., 100) depicting a light source unit (e.g., a BLU 102) and two or more display panels (e.g., 104-1 and 104-2) accordance with some possible embodiments of the present invention.

Example possible embodiments, which relate to high dynamic range (HDR), high definition, wide color gamut (WCG) imaging, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily including, obscuring, or obfuscating the present invention.

Example embodiments are described herein according to the following outline:

1. GENERAL OVERVIEW
2. DISPLAY UNITS
3. LIGHT SOURCES
4. SEQUENTIAL ILLUMINATION OF LIGHT OF DIFFERENT COLORS
5. RENDERING OPERATIONS
6. LIGHT BLEEDING
7. IMAGING SYSTEM
8. EXAMPLE PROCESS FLOWS
9. IMPLEMENTATION MECHANISMS—HARDWARE OVERVIEW
10. EQUIVALENTS, EXTENSIONS, ALTERNATIVES AND MISCELLANEOUS

1. GENERAL OVERVIEW

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

Under techniques described herein, an imaging system may comprise a light source unit capable of emitting light of different colors in different time intervals and stacked display panels comprising at least one monochromatic display panel. As used herein, a light source unit may comprise, but is not limited to, light-emitting diodes, light conversion materials such as quantum dots that regenerate light, incandescent light, fluorescent lights, etc. A display panel may be any display device that comprises a plurality of light valves as pixels, including liquid crystal display, quantum dots display, plasma display, digital micro shutter, multiplexed optical shutter, etc.

In some possible embodiments, some or all of stacked display panels described herein may be monochromatic liquid crystal displays (LCDs). The display panels may be capable of controlling transmittance levels on the basis of individual pixels per each display panel. Sequential emission by the light source unit of light of different colors may be integrated to create an appropriate color perception for image frames. In some possible embodiments, display panels with no or little use of color filters provide substantial improvement in brightness (four to five times brighter) over color display panels with color filters. Further, stacking monochromatic display panels increases the maximum contrast ratio supportable by an imaging system. For example, two display panels each with a maximum contrast ratio of N:1 may be used to result in a display unit with an effective maximum contrast ratio of $N^2$:1 contrast ratio.

Light bleeding between different colors and between neighboring portions of illumination may be reduced and/or eliminated. For example, since light of different colors is emitted in different time intervals, color bleeding is prevented or greatly reduced in an imaging system as described herein. Additionally and/or optionally, at least one of the monochromatic display panels may set certain display portions to dark black, while other display portions on the display panel are illuminated, thereby preventing light bleeding from the illuminated portion to neighboring display portions. Additionally and/or optionally, individual light sources may be controlled to turn off lighting to certain display portions on the display panels, while other individual light sources may be controlled to turn on lighting to other display portions on the display panels, thereby preventing light bleeding from the illuminated portion to neighboring display portions and providing a relatively wide color gamut for a display unit.

In possible embodiments, the loss due to color filters are avoided or reduced. More light may transmit through the front of screen. For example, a display panel (e.g., LCD) with color filters may allow 4% of light transmission, while a monochromatic LCD panel without color filters may allow as much as 40% of light transmission. Stacking two monochromatic LCD panels in a display unit may still allow 20% of light transmission, which is five times of the light transmission of a single LCD panel with color filters, thereby creating a display unit with high brightness.

In some possible embodiments, a monochromatic display panel may be manufactured by simplifying the process that produces color display panels. In addition, a color pixel in a color display panel may be used to create three pixels for a monochromatic display panel in the simplified manufacturing process, thereby significantly increasing the spatial resolution of the monochromatic display panel.

Additionally and/or optionally, a light source with an accurate profile of light wavelengths and/or intensities may be used in a display system as described herein, resulting in illuminating pixels in the display system with white light at a particular white point (e.g., D65 or D50) in a color gamut supported by the display system. Thus, images created by the display system may be highly accurate in terms of color values. In order to get a desired white point the mixes of the Quantum Dots of the primaries may not by themselves result in a particular white point but with the different characteristics of the systems such as the profile of the color filters this can result in an accurate white point. In some possible embodiments, quantum dots may be disposed in front of (e.g., LCD) pixels, and/or replace one or more color filters that would be placed in front of the pixels. In some possible embodiments, replacing the color filters with quantum dots of a particular regeneration frequency gives better performance. In some possible embodiments, a patterned quantum dot layer may sit directly over other light sources (e.g., LEDs, other quantum dots light sources, etc.) as a sheet but may be patterned in such a way to be disposed over LEDs of a particular color (e.g., blue). The patterned quantum dot layer may be used to regenerate light of particular wavelengths or the particular color accurately. In some possible embodiments, a quantum dot layer with multiple types of quantum dots or multiple patterned quantum dot layers may be used to control multiple primary colors in a color model to provide wide color gamuts of three, four, five, six (primary colors), or more, for example, as described in ITU-R Recommendation BT.709 by International Telecommunication Union and CIE L*a*b* (CIELAB) by the International Commission on Illumination, which are incorporated herein by reference for all purposes as if fully set forth herein.

In some possible embodiments, mechanisms as described herein form a part of a process or system, including but not limited to: a television, set-top box, digital video recorder (DVR), a laptop computer, netbook computer, cellular radiotelephone, digital photo frame, electronic book reader, point of sale terminal, desktop computer, computer workstation, computer kiosk, or various other kinds of terminals and process units. A composite frame can be generated outside of a process rendering device, such as by a standalone set-top box, and the resulting bitstream transmitted to the process rendering device according to possible embodiments.

Various modifications to the possible embodiments and the generic principles and features described herein will be readily apparent to those skilled in the art. Thus, the disclosure is not intended to be limited to the embodiments shown, but is to be accorded the widest scope consistent with the principles and features described herein.

2. DISPLAY UNITS

Figure 1A:
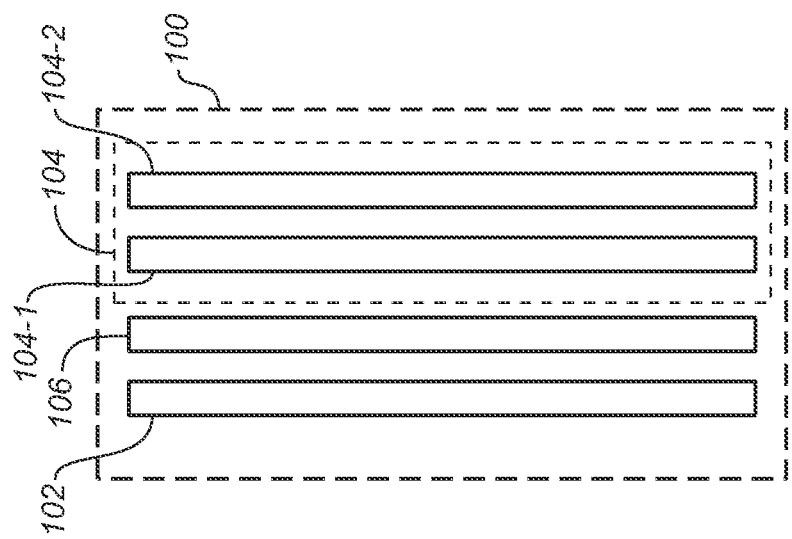
FIG. 1A illustrates an example display unit 100 in accordance with some possible embodiments of the present invention.

FIG. 1A illustrates an example display unit 100 in accordance with some possible embodiments of the present invention. The example display unit 100 may comprise a light source unit (e.g., 102; which may include, but is not limited to, a BLU), a display panel group (e.g., 104) comprising two or more display panels (e.g., 104-1, 104-2, etc.), and an optical configuration (e.g., 106) comprising additional electronic, optical, and/or electro-optical components.

For the purpose of illustration, the optical configuration (106) is shown as interposed between the light source unit (102) and the display panel group (104). It should be noted that, in various possible embodiments, none, some, or all, of the components in the optical configuration (106) may be distributed or positioned on either side, or additionally/optionally in the interior, of the light source unit (102), or the display panel group (104).

For example, a light reflector may be placed in the back (the left side of FIG. 1A) of the light source unit (102) to redirect light back toward the display panel group (104). Zero, one or more collimators or diffusers may be interposed between the light source unit (102) and the display panel group (104) to align/project light towards a viewer on the right side of FIG. 1A. Substrates, one or more polarization and other optical films may be on either side, or additionally/optionally in the interior, of the display panel group (104). Each of the display panels in the display panel group may comprise a plurality of light valves whose transmittance levels may be individually, or collectively, or individually in part and collectively in part, controlled.

In some possible embodiments, the light from the light source unit (102) transmits through the display panel group (104), as aggregately modulated by the transmittance levels of the light valves in the display panels of the display panel group (104) based on received image data, forms images defined in the image data to a viewer to the right of FIG. 1A.

In various possible embodiments, the display panel group (104) may comprise one, two, three, four, five, six, or more monochromatic display panel. As used herein, a monochromatic display panel is free of color filters to impart component colors in a color display system (e.g., red, green, and blue component colors in an RGB display system, or different primary colors in a display system using a different color space). A monochromatic display panel receives component colors directly from a light source and allows incident light of component colors to pass, as modulated by transmittance levels of light valves comprising the monochromatic display panel. A monochromatic display panel may be used to transmit any component color in a color display system implemented by an imaging system herein.

FIG. 1B illustrates an example view of a display unit (e.g., 100) depicting a light source unit (e.g., a BLU 102) and two or more display panels (e.g., 104-1 and 104-2) in accordance with some possible embodiments of the present invention.

A plurality of light valves in a display panel as described herein may be arranged in a geometric shape such as a rectangle as illustrated. Another geometric shape such as ellipse, triangle, quadrilateral, etc., or a combination thereof, may also be used to arrange the light valves on any of the display panels herein.

An individual light valve in a display panel may be of a geometric shape such as a square or a circle. It should be noted that, in various possible embodiments, the shape of a light valve in a display panel (e.g., 104-2) may be of another geometric shape such as rectangle, ellipse, triangle, quadrilateral, etc., or a combination thereof.

The transmittance level of a light valve may be controlled by a digital value such as a pixel value in an image-related data frame (e.g., an original image frame, a color-specific frame, a color-specific, display-panel-specific frame, etc.).

A monochromatic display panel herein (without color filters) may be made in a manufacturing process similar to the one that would produce a color display panel (with color filters). In some possible embodiments, in contrast to the manufacturing process that would produce the color display panel, a step of depositing any color filter layer in the internal structure of a display panel may be omitted from the manufacturing process that produces the monochromatic display panel as described herein. In some possible embodiments, additionally and/or optionally, an individual subpixel in a color display panel (e.g., three subpixels imparting three different colors such as red, green and blue in a pixel of the color display panel) may be individually used as a pixel in a monochromatic display panel herein. Thus, in some possible embodiments, not only does the manufacturing process herein for monochromatic display panels become simpler than the manufacturing process for color display panels, but the monochromatic display panels produced also may be of a 3× higher resolution than the color display panels.

In some possible embodiments, the light source unit (102) may be configured to emit light of different colors time-wise sequentially (one time interval for one color after another time interval for another color). For example, the light source unit (102) may be configured to emit light of a first color (e.g., red) for a first interval (e.g., 1 millisecond or ms), light of a second color (e.g., green) for a second interval (e.g., 1.1 ms), and light of a third color (e.g., blue) for a third interval (e.g., 1.2 ms). In various possible embodiments, a time interval for emitting light of a particular color may be the same, or different from another time interval for emitting light of another color different from the particular color. In addition, an imaging system as described herein may adopt a different color display system other than an RGB display system. In various possible embodiments, the light source unit (102) may emit two, three, four, five, six, or more different color light in order to support a relatively wide color gamut in rendering color images on the display panels.

In some possible embodiments, different portions of the light source unit (102) may be configured to emit light of different colors time-wise in a same time interval to illuminate different portions of the display panels herein. For example, a first portion of the light source unit (102) may be configured to emit light of a first color (e.g., red) for a first interval (e.g., 1 millisecond or ms), light of a second color (e.g., green) for a second interval (e.g., 1.1 ms), and light of a third color (e.g., blue) for a third interval (e.g., 1.2 ms). A second portion of the light source unit (102) may be configured to emit light of the second color (green) for the first interval, light of the third color (blue) for the second interval, and light of the first color (red) for the third interval.

In some possible embodiments, all the display panels may have the same spatial resolutions. For example, display panel 104-1 and display panel 104-2 may have the same spatial resolutions. In some possible embodiments, each individual pixel (or light valve) on one (e.g., 104-1) of the display panels in the display panel group 104 has a two-way, 1-1 correspondence relationship with another pixel (or light valve) on another (e.g., 104-2) of the display panels. A sequence of corresponding pixels may comprise a corresponding pixel from each of two or more (e.g., all) display panels in the display panel group 104, forming a collective pixel that may be used to express a pixel value in a received image frame. More specifically, light from the light source unit (102), which may be collimated and diffused to provide a relatively uniform illumination on the display panels, may successively travel through the sequence of corresponding pixels in order to express a pixel value in an image frame that is to be rendered by the display unit (100).

In some possible embodiments, at least two (e.g., 104-1 and 104-2) of the two or more display panels in the display panel group (104) may have different spatial resolutions. For example, display panel 104-1 may have a finer spatial resolution than display panel 104-2, or vice versa. In some possible embodiments, an individual group of pixels (or light valves) on one (e.g., 104-2) of the display panels in the display panel group 104 has a two-way, 1-1 correspondence relationship with a pixel (or light valve) on another (e.g., 104-1) of the display panels. For example, a pixel in a display panel with a coarser resolution may correspond to a group of pixels in another display panel with a finer resolution. A sequence of corresponding pixels may comprise a corresponding pixel from each of two or more (e.g., all) display panels in the display panel group 104. Light from the light source unit (102), which may be collimated and diffused to provide a relatively uniform illumination on the display panels, may successively travel through the sequence of corresponding pixels in order to express a pixel value in an image frame that is to be rendered by the display unit (100).

In various possible embodiments, each pixel in a sequence of corresponding pixels as described herein may be set to a different pixel value specific to a display panel to which the pixel belongs and specific to a color in which a portion of the display panel containing the pixel is illuminated.

In some possible embodiments, the light source unit (102) may comprise a plurality of individual light sources, which may be individually, or collectively, or individually in part and collectively in part. For example, the light source unit (102) may be configured to turn on none, some, or all, of light sources in the plurality of light sources. In some possible embodiments, the light source unit (102) may be configured to set intensities of individual light sources in the plurality of light sources to any in a plurality of intensities (including but not limited to a "fully on" intensity, a minimum intensity, zero intensity, etc.), individually, or collectively, or individually in part and collectively in part. In some possible embodiments, an imaging system as described herein may determine, based on image data of one or more image frames that are to be rendered on the display panel group (104), individual intensities for individual light sources in the plurality of light sources for a specific time interval. The intensities may also vary with different colors of light to be emitted. For example, red and blue light emissions from a light source may be set to a higher intensity than green light emission for a monochromatic display panel that may be more efficient in transmitting green light than red and blue light. Thus, in some possible embodiments, a light source in the plurality of light sources herein may be configured and/or controlled to emit light of one color with an equal intensity, a higher intensity, or a longer time duration, etc., while emit light of a different color with the equal intensity, a lower intensity, a shorter time duration, etc., to produce a relatively accurate color profile.

In some possible embodiments, different time intervals for emitting light of different colors to illuminate a portion of the display panels may be arranged time-wise sequentially without overlapping. In some possible embodiments, one or more time gaps may or may not be inserted between a time interval for emitting light of a color and a time interval of emitting light of a different color next to the color in a sequence of light emission. As used herein, a time gap refers to a time interval during which pixels are not illuminated with light from the light source unit (102).

In some possible embodiments, additionally and/or optionally, one or more time gaps may or may not be inserted within a time interval for emitting light of the same color to illuminate at least a portion of the display panels. For example, due to a time gap inserted within, a time interval for emitting a red color may be segmented into two time segments, each emitting light of the same color. This capability may be used by an imaging system to illuminate different portions of the display panels in different times with the same light. For instance, some portions (e.g., white squares in a checker-like pattern) of the display panels may be illuminated by red light in a first time segment of a time interval, while some other portions (e.g., black squares in the checker-like pattern) of the display panels may be illuminated by red light in a second time segment of the time interval, where the first time segment and the second time segment may be separated by a time gap in which pixels are not illuminated with light from the light source unit (102).

In some possible embodiments, an imaging system as described herein may be configured to receive one or more image frames to be rendered on the display unit (100). These image frames may comprise a plurality of pixel values for images of various possible spatial resolutions, various possible dynamic ranges, and various possible combinations of colors. In some possible embodiments, the imaging system may be configured to create a plurality of color-specific frames from an (original) image frame that is to be rendered. A color specific frame may capture the content of the original image in a specific color. This color specific frame may be used by the imaging system to drive at least one portion of the display panels in the display unit (100). This color specific frame may, but does not have to, also be used by the imaging system to drive light sources in the light source unit (102) that illuminate the at least one portion of the display panels.

In some possible embodiments, a color-specific frame may comprise a plurality of color-specific pixel values in the same spatial resolution as the original image frame. Each color-specific pixel value in the plurality specifies a luminance level of a particular pixel in an image rendered by the display unit (100), which may be used by the imaging system to set a collective transmittance level of a collective pixel of the display panels for a particular color. In some possible embodiments, one or more color-specific pixel values may be used to determine each of individual transmittance levels of individual corresponding pixels in a sequence of corresponding pixels in at least one portion of the plurality of display panels in the display unit (100), when the at least one portion of the plurality of display panels is illuminated with light of a same color as that is specific to the color-specific frame. For example, a red-specific frame as derived from an original image frame may be used to control transmittance levels of pixels in one or more portions of the plurality of display panels (e.g., 104-1 and 104-2) on an individual pixel basis in a time interval. In some possible embodiments, a blue-specific frame as derived from the original image frame may be used to control transmittance levels of pixels in one or more other portions of the plurality of display panels (e.g., 104-1 and 104-2) on an individual pixel basis in the same time interval.

In some possible embodiments, a color-specific, display-panel-specific frame may be used to drive at least one portion of a display panel. If a pixel value in the color-specific, display-panel-specific frame may be used to set a pixel in a display panel to a transmittance level, the pixel value may be derived from an individual pixel value in a color-specific frame or, alternatively and/or optionally, an original image frame. Alternatively and/or optionally, the pixel value may be based on an average, or an aggregate, of some or all bits from one or more pixel values in a color-specific frame, or in an original image frame.

In some other possible embodiments, some bits (e.g., higher-order bits such as the upper half bits) of a color-specific pixel value in a color-specific frame may be used to set a transmittance level of a pixel in one display panel (e.g., 104-1), while some other bits (e.g., lower-order bits such as the lower half bits) of the color-specific pixel value in the color-specific frame may be used to set a transmittance level of a pixel in another display panel (e.g., 104-2). If a display panel has a different spatial resolution than that of the original image frame, then a pixel in the display panel may be set to a transmittance level based on an average, or an aggregate, of some or all bits from one or more pixel values in a color-specific frame.

In some possible embodiments, at least one portion of a first display panel may be configured to support a first color-specific, display-panel-specific frame, or a first number of bits in pixel values of a color-specific frame; at least one corresponding portion (e.g., comprising pixels corresponding to pixels in the first display panel) of a second display panel may be configured to support a second color-specific, display-panel-specific frame, or a second number of bits in pixel values of another color-specific frame; and so on. In some possible embodiments, the numbers of bits in pixel values in different color-specific, display-panel-specific frames (e.g., the first number and the second number of bits in a color-specific frame giving rise to the different color-specific, display-panel-specific frames) may be same or different. Multiple display panels of lower dynamic ranges (e.g., eight bits) may be used by an imaging system herein to collectively produce images with much higher dynamic ranges (e.g., 16 bits, 20 bits, 24 bits, etc.) than each of the multiple display panels is capable of supporting.

In some possible embodiments, one, two, three, or more of the display panels herein may be monochromatic, free of color filters that would impart component colors that would be used to express a color pixel value. A mixed color comprising two or more component colors may be realized by time-wise sequentially illuminating light of different colors on at least one portion of the display panels in the display unit (104) and by setting transmittance levels of individual pixels in the at least one portion of the display panels based on color-specific-display-panel-specific frames derived from (original) image frames. Thus, an imaging system as described herein may be configured to support a relatively wide color gamut. For example, the imaging system may reproduce or be configured to differentiate relatively bright, relatively highly saturated colors using lights of different colors emitted from the light source unit (102) with no or little color filtering/adulteration by the display panels.

3. LIGHT SOURCES

Figure 2A:
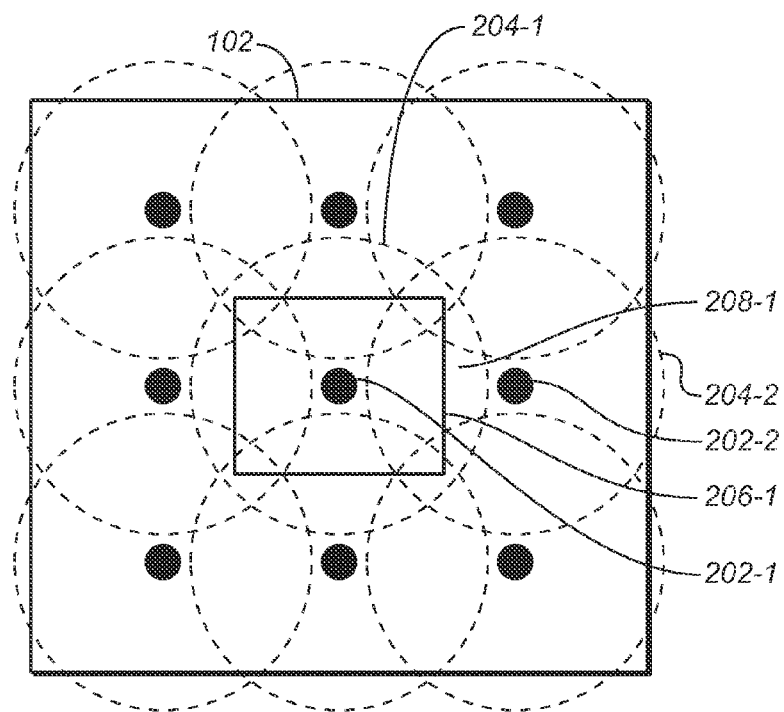
FIG. 2A illustrates an example configuration of light sources in a light source unit in accordance with some possible embodiments of the present invention.

FIG. 2A illustrates an example configuration of light sources in a light source unit (e.g., 102) in accordance with some possible embodiments of the present invention. The individual light sources (e.g., 202-1 and 202-2) may, but are not limited to, be arrayed in a lattice pattern in some example embodiments.

A light source may illuminate a portion of a surface in a shape defined by a point spread function. For the purpose of illustration, the point spread function of each of the light sources (e.g., 202-1 and 202-2) may illuminate a circular portion (e.g., one of illumination areas 204-1 and 204-2) on a surface (e.g., a surface of the first display panel in the display panel group (104) that receives light from the light source unit (102)).

An illuminated area (e.g., 204-1) may be logically divided into a designated portion (206-1 in this example) and a bleeding portion (208-1). The bleeding portion (208-1) may comprise a number of sub portions in which the illumination from the light source (204-1) overlaps with the illumination from an adjacent light source (e.g., 204-2). Other light sources (e.g., adjacent light sources such as 204-2) bleed illumination into some portions within the designated portion (206-1) of the light source (204-1).

An imaging system herein may be configured to set the operational states of the light sources to provide the desired illumination on a surface such as the first surface (e.g., an interior surface of display panel 104-1) of the display panels in the display panel group (104). In some possible embodiments, light sources may have only one operational state: always on. In some possible embodiments, light sources may have two or more operational states: off, on (a maximum illumination state), and one or more intermediate illumination states.

In some possible embodiments, light sources may be configured to be in one of one or more light emitting states (e.g., a normal state, an energy saving state, etc.) irrespective of images frames to be rendered.

In some possible embodiments, based on image data contained in one or more image frames to be rendered on the display panels, an imaging system as described herein may determine that a designated portion (206-1) of a light source (202-1) should be illuminated for a specific color at a certain level and accordingly determine that the light source 202-1 should be set for the specific color in a corresponding operational state. The imaging system may determine that another designated portion of another light source should be illuminated for another specific color (which may or may not be the same as the specific color related to the light source (202-1)) at another certain level and accordingly determine that the other light source should be set for the other specific color in another corresponding operational state. This determination may be repeated by the imaging system for all the light sources in the system.

Figure 2B:
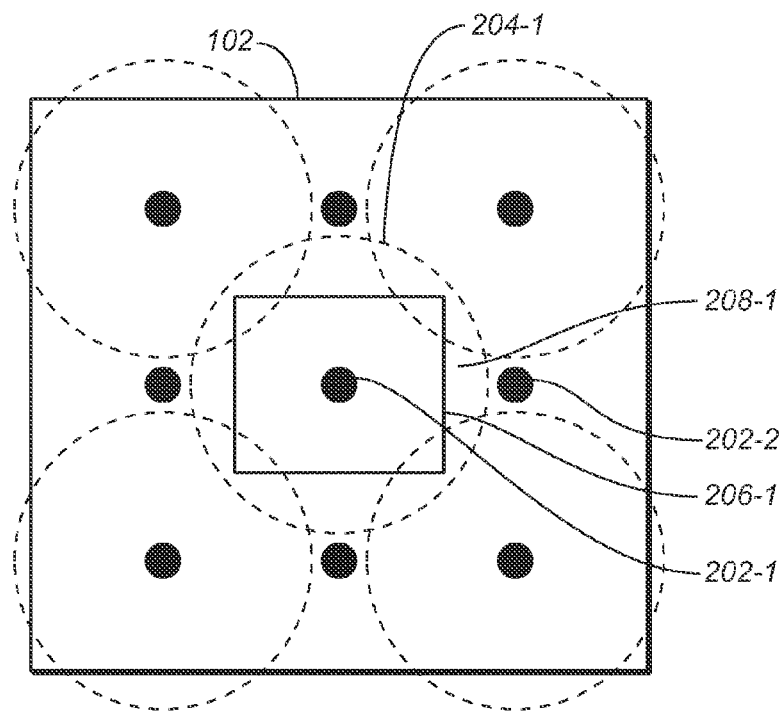
FIG. 2B illustrates possible embodiments in which some light sources are turned off while some light sources are turned on, according to possible embodiments of the present invention.

FIG. 2B illustrates possible embodiments in which some light sources are turned off while some light sources are turned on. In some possible embodiments, some portions of the first surface may be illuminated for a time duration in which some other portions of the first surface should not be illuminated. In some possible embodiments, light of the same color may be illuminated on the portions of the first surface that are to be illuminated for the time duration. In some other possible embodiments, light of different colors may be illuminated on the portions of the first surface that are to be illuminated for the time duration. This may be accomplished, for example, by turning on some (e.g., 202-1) of the light sources in the light source units (102) and turning off some other (e.g., 202-2) of the light sources. In embodiments in which light of different colors may be illuminated on the portions of the first surface for the time duration, the light different colors may form a regular pattern, or a randomized pattern.

For the purpose of illustration, light sources have been shown arranged in a rectangular lattice. It should be noted that, in various possible embodiments, light sources may be arranged in different ways including different forms other than a rectangular form. For example, a triangular form, a hexagonal form, a diagonal pattern, etc., may be used to arrange light sources in various possible embodiments.

4. SEQUENTIAL ILLUMINATION OF LIGHT OF DIFFERENT COLORS

Figure 3A:
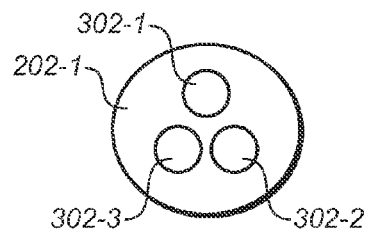
FIG. 3A illustrates an example light source in accordance with some possible embodiments of the present invention.

FIG. 3A illustrates an example light source (e.g., 202-1) in accordance with some possible embodiments of the present invention. In an illustrated example, the light source (202-1) may comprise three different component light sources (302-1, 302-2 and 302-3). Each component light source (e.g., 302-1) may emit light of a color (e.g., red) different from colors (e.g., green and blue) of light emitted by other component light sources (302-2 and 302-3 in the present example). In a color display system such as an RGB system, each of the component light sources may be configured to emit red, green, or blue light. An imaging system or a light source unit (e.g., 102), in the imaging system, may be configured to emit light of different colors in different time intervals in a sequential order with or without time gaps in between or within these time intervals.

A light source described herein may, but is not limited to, be configured to emit light of a pure color. Additionally and optionally, a light source may, but is not limited to, be configured to emit only light within one contiguous range of light frequencies. For example, a light source may emit green light in an RGB display system which comprises both a deeper shade of green and a lighter shade of green. Similarly, a light source may emit red light in an RGB display system which comprises red light in one, two, three, or more contiguous ranges of light frequencies.

For the purpose of illustration, a light source in FIG. 3A has been shown as comprising three component light sources that may be configured to sequentially emit light of different colors. It should be noted that, in various possible embodiments, a light source may comprise more than three component light sources to emit light of more than three (primary) colors. With more colors that can be emitted by the light source (202-1) individually and exclusively during a time duration, certain colors in a color gamut herein may be directly created by relatively highly saturated colors, rather than indirectly created by mixtures of lights of different colors whose relative intensities would have to be relatively precisely tuned.

For the purpose of illustration, a light source has been shown in a circular shape. It should be noted that, in various possible embodiments, a light source may be in one of one or more different shapes that are not necessarily a circular shape. For example, a light source may be in a rectangular shape. In various possible embodiments, a component light source in a light source (e.g., 202-1) also may be in one of one or more different shapes that are different from the circular shape as illustrated. For the purpose of illustration, component light sources in a light source have been shown with no spatial overlapping between any two component light sources. In various possible embodiments, component light sources in a light source may overlap one another. In some possible embodiments, a component light source may occupy an entire light emitting area of the light source. In some possible embodiments, component light sources may comprise light emitting layers as provided by coating layers; in these embodiments, at least one, and maybe all, of the light emitting layers may cover the entire light-emitting surface of a light source; one or more of these light emitting layers may be configured to emit light of its individual colors sequentially or at the same time.

Figure 3B:
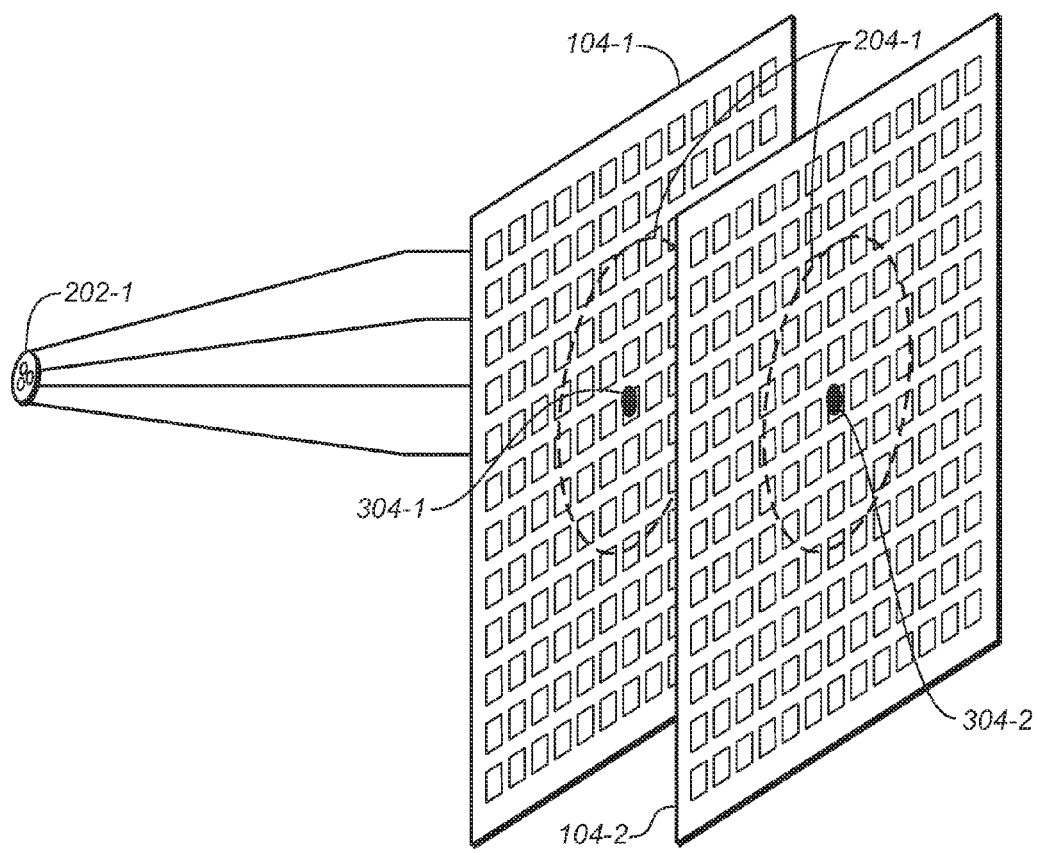
FIG. 3B shows a diagram illustrating how a pixel value may be expressed by a collective pixel using a light source unit comprising at least one light source and a display panel group comprising two or more display panels in accordance with some possible embodiments of the present invention.

FIG. 3B shows a diagram illustrating how a pixel value may be expressed by a collective pixel using a light source unit (e.g., 102) comprising at least one light source (e.g., 202-1) and a display panel group (e.g., 104) comprising two or more display panels (e.g., 104-1 and 104-2) in accordance with some possible embodiments of the present invention. Light from the light source (202-1) may be collimated and/or diffused to illuminate a (circular) portion (204-1) of a surface of the first display panel (104-1) in the display panel group (104) and of a surface of the last display panel (104-2) in the display panel group (104). For the purpose of illustration, the portion illuminated on the first display panel may correspond to (e.g., same shape, same size, etc.) a portion illuminated on the second display panel assuming the light from the light source (202-1) is properly collimated and is not blocked by the preceding display panel(s) before the last display panel (102-2). However, in some scenarios, the portions from the same light source on different display panels in the display panel group (104) may vary to some extent, depending on the optical configuration implemented in the imaging system. The portion of the surface of the first display panel (104-1) may include a pixel (304-1), while the portion of the surface of the last display panel (104-2) may include a pixel (304-2). While the pixel (304-1) on the first display panel (104-1) may or may not be of the same size as that of the pixel (304-2) on the last display panel (104-2), the pixel (304-1) and the pixel (304-2) correspond to each other and may be a part of the same sequence of corresponding pixels from each of the display panels (which may comprise the display panels 104-1, 104-2, and zero or more display panels) in the display unit, corresponding to a same collective pixel.

The same portion of light from the light source (202-1) may successively travel through the sequence of corresponding pixels (304-1, 304-2, etc.) in order to express a pixel value in an image frame that is to be rendered by the display unit (100). In various possible embodiments, each pixel (one of 304-1, 304-2, etc.) in a sequence of corresponding pixels as described herein may be set to a different pixel value specific to a display panel (e.g., 104-1) to which the pixel (304-1) belongs.

5. RENDERING OPERATIONS

Figure 3C:
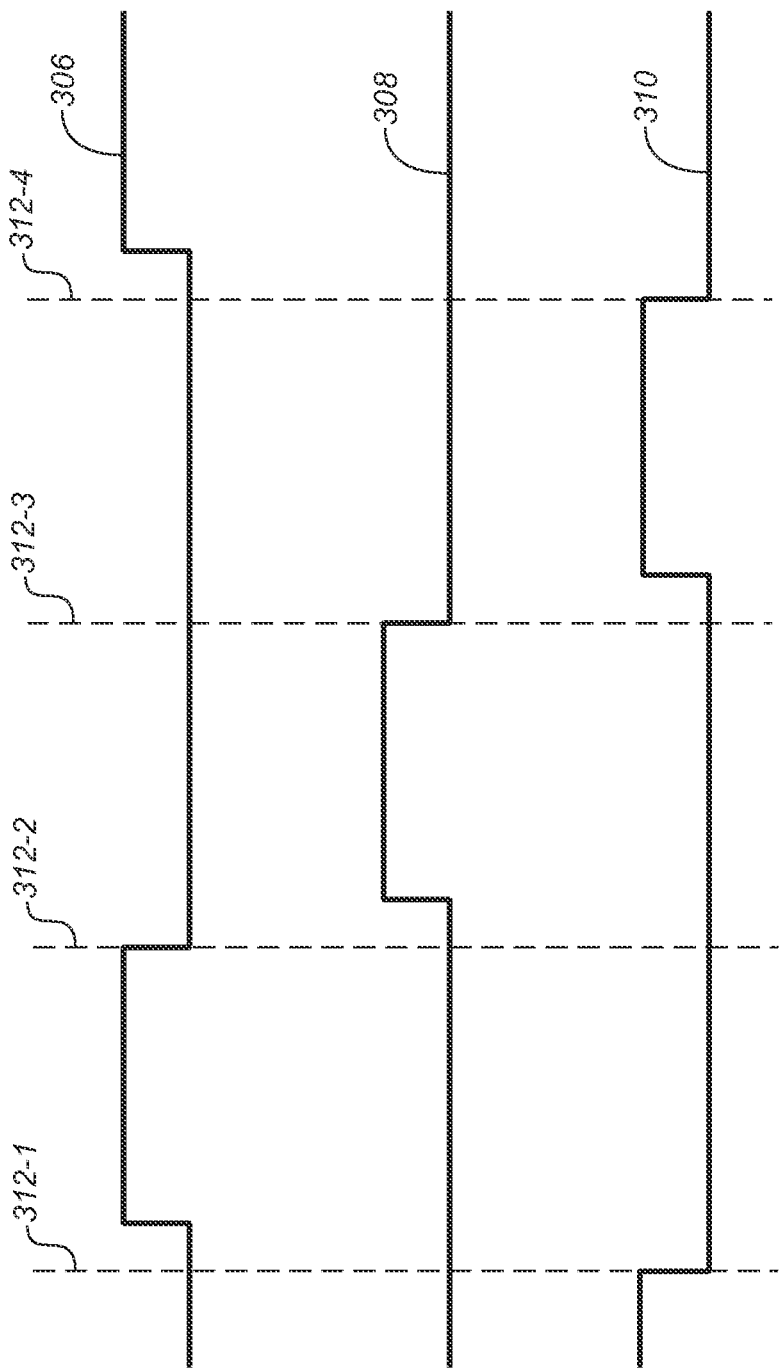
FIG. 3C illustrates operations of an imaging system with three example waveforms, in accordance with some possible embodiments of the present invention.

FIG. 3C illustrates example operations of an imaging system (e.g., an RGB imaging system) with example waveforms (e.g., 306, 308 and 310), in accordance with some possible embodiments of the present invention. For the purpose of illustration only, three waveforms may be used by the imaging system to drive one or more light sources (e.g., including 202-1) in a light source unit (e.g., 102) to illuminate at least one portion of a display panel group. In some possible embodiments, waveform 306 may be used to drive one or more component light sources (e.g., including 304-1 in light source 202-1) that are configured to emit light of a first color (e.g., red) to illuminate the at least one portion of the display panel group; waveform 308 may be used to drive one or more component light sources (e.g., including 304-2 in light source 202-1) that are configured to emit light of a second color (e.g., green) to illuminate the at least one portion of the display panel group; waveform 310 may be used to drive one or more component light sources (e.g., including 304-3 in light source 202-1) that are configured to emit light of a third color (e.g., blue) to illuminate the at least one portion of the display panel group; and so on.

In some possible embodiments, the component light sources of the first color (red) may be turned on after a time point 312-1, while the component light sources of other colors (green and blue in this example) may be turned off. The emission of the light of the first color and non-emission of the light of the other colors may last for a first time interval until a time point 312-2. In some possible embodiments, the at least one portion of display panels (e.g., 104-1 and 104-2) in the display panel group (104) illuminated by the light of the first color may be loaded with pixel values that are derived based on pixel values in an image frame to be rendered.

The component light sources of the second color (green) may be turned on after the time point 312-2, while the component light sources of other colors (red and blue in this example) may be turned off. The emission of the light of the second color and non-emission of the light of the other colors may last for a second time interval until a time point 312-3.

The component light sources of the third color (blue) may be turned on after the time point 312-3, while the component light sources of other colors (red and green in this example) may be turned off. The emission of the light of the third color and non-emission of the light of the other colors may last for a third time interval until a time point 312-4.

In some possible embodiments, the image frame may be decomposed into a plurality of color-specific frames each of which comprises color-specific pixel values for a plurality of colors (red, green and blue) used in a display system (an RGB system in this example). A color-specific frame for a color (e.g., red) may be used to derive one or more color-specific, display-panel-specific frames (e.g., two frames: 1. red, display panel 104-1, and 2. red, display panel 104-2) each of which comprises color-specific, display-panel-specific pixel values. It should be noted that the number of pixel values comprised in the color-specific, display-panel-specific frames may or may not be the same. For example, display panel 104-1 may be a lower resolution display panel; a color-specific, display-panel-specific frame for display panel 104-1 may comprise fewer pixel values than a color-specific, display-panel-specific frame for display panel 104-2.

In some possible embodiments, during the first time interval, the at least one portion of the display panels (104-1 and 104-2) in the display panel group (104) may be loaded with the color-specific, display-panel-specific frames for the first color. During the second time interval, the at least one portion of the display panels (104-1 and 104-2) in the display panel group (104) may be loaded with the color-specific, display-panel-specific frames for the second color. During the third time interval, the at least one portion of the display panels (104-1 and 104-2) in the display panel group (104) may be loaded with the color-specific, display-panel-specific frames for the third color.

In some possible embodiments, additionally and/or optionally, one or more time gaps may be inserted between time intervals of emitting different colors. The time gaps may limit light of a preceding color in a preceding interval from bleeding into a succeeding interval in which light of a different color is supposed to be emitted. In some possible embodiments, a time gap may be implemented by turning off all the component light sources in the one or more light sources. In some possible embodiments, a time gap may be implemented by setting one or more display panels (e.g., a monochromatic display panel in the display unit 104) to dark black. In some possible embodiments, a time gap may be implemented by both turning off the component light sources and setting the display panels to dark black.

6. LIGHT BLEEDING

Figure 3D:
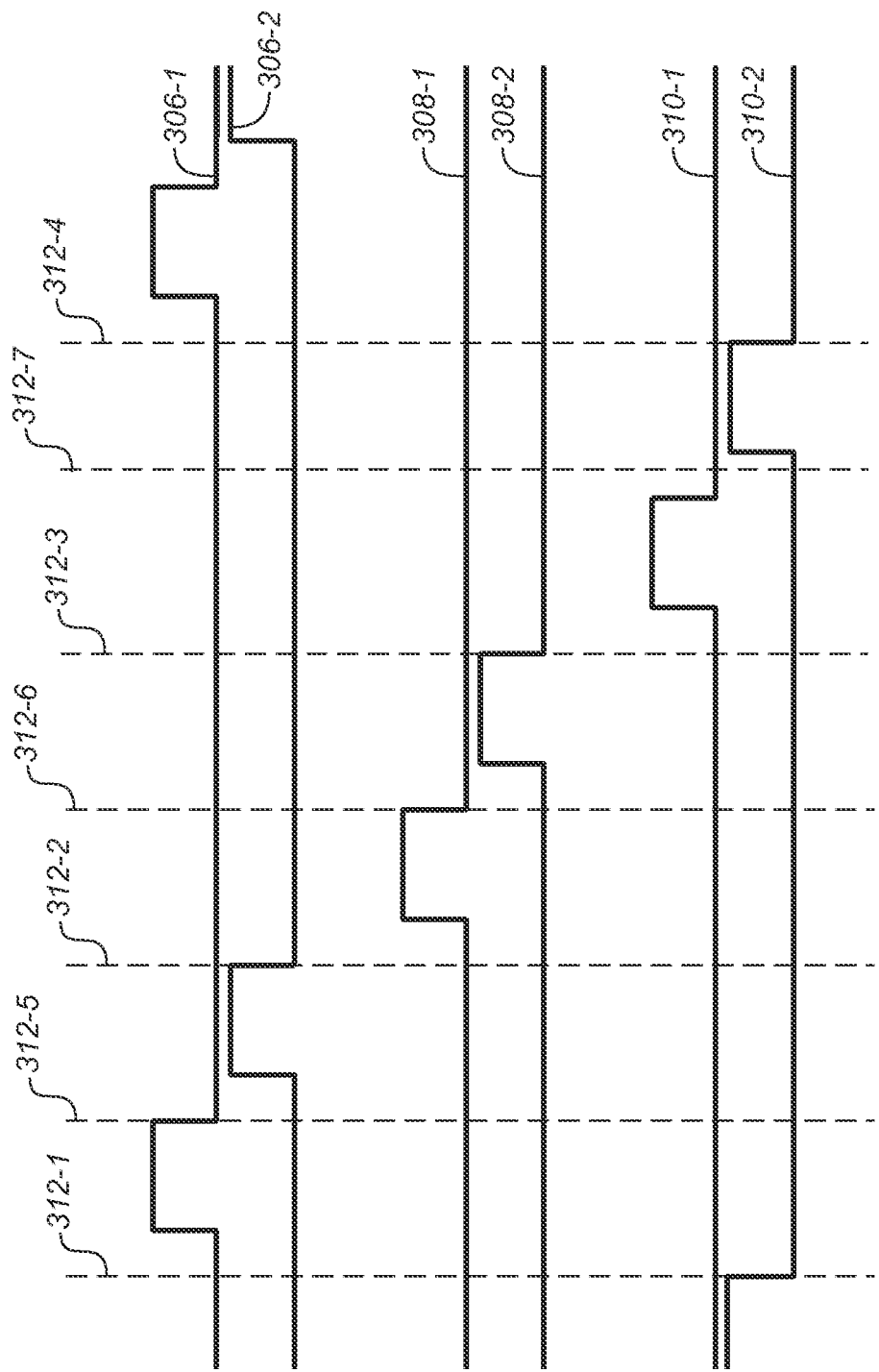
FIG. 3D illustrates operations of an imaging system with six example waveforms, in accordance with some possible embodiments of the present invention.

FIG. 3D illustrates example operations of an imaging system (e.g., an RGB imaging system) with example waveforms (e.g., 306-1, 306-2, 308-1, 308-2, 310-1, and 310-2), in accordance with some possible embodiments of the present invention. Six waveforms may be used by the imaging system to drive two or more light sources (e.g., including 202-1 and 202-2 of FIG. 2A) in a light source unit (e.g., 102).

In some possible embodiments, component light sources as driven by the waveforms 306-1, 308-1, and 310-1 may illuminate one or more first portions of a surface of the first display panel (e.g., 104-1) in the display panel group (104), where the one or more first portions of the surface may comprise one or more first designated portions of some light sources (e.g., light sources in the "on" states in FIG. 2B); each of the one or more first designated portions may be assigned to be illuminated by these light sources (the light sources in the "on" states in FIG. 2B). In some possible embodiments, component light sources as driven by the waveforms 306-2, 308-2, and 310-2 may illuminate one or more second portions of the surface of the first display panel (e.g., 104-1) in the display panel group (104), where the one or more second portions of the surface may comprise one or more second designated portions of some light sources (e.g., designated portions for light sources in the "off" states in FIG. 2B); each of the one or more second designated portions may be assigned to be illuminated by these light sources (the light sources in the "off" states in FIG. 2B). In some possible embodiments, a designated portion for one of the light sources as driven by the waveforms 306-1, 308-1, and 310-1 may be surrounded by designate portions for other lights source as driven by the waveforms 306-2, 308-2, and 310-2.

In some possible embodiments, waveform 306-1 may be used to drive one or more component light sources (e.g., including 304-1 in light source 202-1) that are configured to emit light of a first color (e.g., red) after time point 312-1 before time point 312-5 to illuminate the one or more first portions; waveform 308-1 may be used to drive one or more component light sources (e.g., including 304-2 in light source 202-1) that are configured to emit light of a second color (e.g., green) after time point 312-2 before time point 312-5 to illuminate the one or more first portions; waveform 310-1 may be used to drive one or more component light sources (e.g., including 304-3 in light source 202-1) that are configured to emit light of a third color (e.g., blue) after time point 312-3 before time point 312-6 to illuminate the one or more first portions; and so on. In some possible embodiments, waveform 306-2 may be used to drive one or more component light sources that are configured to emit light of a fourth color (which may or may not be the same as the second color, for example) after time point 312-5 before time point 312-2 to illuminate the one or more second portions; waveform 308-2 may be used to drive one or more component light sources that are configured to emit light of a fifth color (which may or may not be the same as the third color, for example) after time point 312-6 before time point 312-3 to illuminate the one or more second portions; waveform 310-1 may be used to drive one or more component light sources that are configured to emit light of a sixth color (which may or may not be the same as the first color, for example) after time point 312-7 before time point 312-4 to illuminate the one or more second portions; and so on.

In some possible embodiments, in the one or more first portions, the component light sources of the first color (red) as driven by the waveform 306-1 may be turned on, while the component light sources as driven by the other waveforms may be turned off. The emission of the light of the first color from the component light sources as driven by the waveform 306-1 may last for a first time interval until a time point 312-5. In some possible embodiments, the first portions of display panels (e.g., 104-1 and 104-2) in the display panel group (104) designated to be illuminated by the light of the first color as driven by the waveform 306-1 may be loaded with pixel values that are derived based on pixel values in an image frame to be rendered. In some possible embodiments, additionally and/or optionally, the second portions of display panels (104-1 and 104-2) not designated to be illuminated by the light of the first color as driven by the waveform 306-1 may be loaded with dark black pixel values to prevent light bleeding from the first portions currently designated to be illuminated to the second portions currently not designated to be illuminated.

In some possible embodiments, in the one or more second portions, the component light sources of the fourth color as driven by the waveform 306-2 may be turned on after the time point 312-5, while the component light sources as driven by the other waveforms may be turned off. The emission of the light of the fourth color from the component light sources as driven by the waveform 306-2 may last for a second time interval until a time point 312-2. In some possible embodiments, the second portions of display panels (e.g., 104-1 and 104-2) in the display panel group (104) designated to be illuminated by the light of the first color as driven by the waveform 306-2 may be loaded with pixel values that are derived based on pixel values in an image frame to be rendered. In some possible embodiments, additionally and/or optionally, the first portions of display panels (104-1 and 104-2) not designated to be illuminated by the light of the fourth color as driven by the waveform 306-2 may be loaded with dark black pixel values to prevent light bleeding from the second portions currently designated to be illuminated to the first portions currently not designated to be illuminated.

In some possible embodiments, in the one or more first portions, the component light sources of the second color (green) as driven by the waveform 308-1 may be turned on after the time point 312-2, while the component light sources as driven by the other waveforms may be turned off. The emission of the light of the second color from the component light sources as driven by the waveform 308-1 may last for a third time interval until a time point 312-6. In some possible embodiments, the first portions of display panels (e.g., 104-1 and 104-2) in the display panel group (104) designated to be illuminated by the light of the second color as driven by the waveform 308-1 may be loaded with pixel values that are derived based on pixel values in an image frame to be rendered. In some possible embodiments, additionally and/or optionally, the second portions of display panels (104-1 and 104-2) not designated to be illuminated by the light of the second color as driven by the waveform 308-1 may be loaded with dark black pixel values to prevent light bleeding from the first portions currently designated to be illuminated to the second portions currently not designated to be illuminated.

In some possible embodiments, in the one or more second portions, the component light sources of the fifth color as driven by the waveform 308-2 may be turned on after the time point 312-6, while the component light sources as driven by the other waveforms may be turned off. The emission of the light of the fifth color from the component light sources as driven by the waveform 308-2 may last for a fourth time interval until a time point 312-3. In some possible embodiments, the second portions of display panels (e.g., 104-1 and 104-2) in the display panel group (104) designated to be illuminated by the light of the fourth color as driven by the waveform 308-2 may be loaded with pixel values that are derived based on pixel values in an image frame to be rendered. In some possible embodiments, additionally and/or optionally, the first portions of display panels (104-1 and 104-2) not designated to be illuminated by the light of the fourth color as driven by the waveform 308-2 may be loaded with dark black pixel values to prevent light bleeding from the second portions currently designated to be illuminated to the first portions currently not designated to be illuminated.

In some possible embodiments, in the one or more first portions, the component light sources of the third color (blue) as driven by the waveform 310-1 may be turned on after the time point 312-3, while the component light sources as driven by the other waveforms may be turned off. The emission of the light of the third color from the component light sources as driven by the waveform 310-1 may last for a fifth time interval until a time point 312-7. In some possible embodiments, the first portions of display panels (e.g., 104-1 and 104-2) in the display panel group (104) designated to be illuminated by the light of the third color as driven by the waveform 310-1 may be loaded with pixel values that are derived based on pixel values in an image frame to be rendered. In some possible embodiments, additionally and/or optionally, the second portions of display panels (104-1 and 104-2) not designated to be illuminated by the light of the third color as driven by the waveform 310-1 may be loaded with dark black pixel values to prevent light bleeding from the first portions currently designated to be illuminated to the second portions currently not designated to be illuminated.

In some possible embodiments, in the one or more second portions, the component light sources of the sixth color as driven by the waveform 310-2 may be turned on after the time point 312-7, while the component light sources as driven by other waveforms including those of other colors (red and green in this example) and those driven by the waveform 310-1 of the same color may be turned off. The emission of the light of the third color from the component light sources as driven by the waveform 310-2 may last for a sixth time interval until a time point 312-4. In some possible embodiments, the second portions of display panels (e.g., 104-1 and 104-2) in the display panel group (104) designated to be illuminated by the light of the sixth color as driven by the waveform 310-2 may be loaded with pixel values that are derived based on pixel values in an image frame to be rendered. In some possible embodiments, additionally and/or optionally, the first portions of display panels (104-1 and 104-2) not designated to be illuminated by the light of the sixth color as driven by the waveform 310-2 may be loaded with dark black pixel values to prevent light bleeding from the second portions currently designated to be illuminated to the first portions currently not designated to be illuminated.

As previously explained, in some possible embodiments, the image frame may be decomposed into a plurality of color-specific frames each of which comprises color-specific pixel values for a plurality of colors (red, green and blue) used in a display system (an RGB system in this example). A color-specific frame for a color (e.g., red) may be used to derive individual portions in one or more color-specific, displaypanel-specific frames (e.g., two frames: 1. red, display panel 104-1, and 2. red, display panel 104-2) each of which comprises color-specific, display-panel-specific pixel values. A color-specific, display-panel-specific frame for a color (e.g., red, display panel 104-1) may be used to derive individual portions in one or more color-specific, display-panel-specific, designated-portions-specific frames (e.g., two frames: 1. red, display panel 104-1, the first designated portions; and 2. red, display panel 104-1, the second designated portions) each of which comprises color-specific, display-panel-specific pixel values for one or more designated portions, while other designated portions may or may not be loaded with dark black pixel values.

In some possible embodiments, additionally and/or optionally, one or more time gaps may be inserted between and within time intervals of emitting different colors. The time gaps may limit light of a preceding color in a preceding interval from bleeding into a succeeding interval in which light of a different color is supposed to be emitted. In some possible embodiments, a time gap may be implemented by turning off all the component light sources in the one or more light sources. In some possible embodiments, a time gap may be implemented by setting one or more display panels (e.g., a monochromatic display panel in the display unit 104) to dark black. In some possible embodiments, a time gap may be implemented by both turning off the component light sources and setting the display panels to dark black.

For the purpose of the present invention, other similar operations that time-wise sequentially illuminate at least one portion of display panels with different colors may be used. For example, one or more component light sources may be driven by the waveforms 306, 308, 310 instead of the waveforms 306-1, 306-2, 308-1, 308-2, 310-1, and 310-2, while the at least one portion of the display panels may be loaded by color-specific, display-panel-specific, and designated-portions-specific frames. Each of the illumination intervals in the waveforms 306, 308, and 310 as illustrated in FIG. 3C may comprise two time sub intervals. One sub interval in an illumination interval may be loaded with one color-specific, display-panel-specific, and designated-portions-specific frame for the first designated portions, while the other sub interval in the illumination interval may be loaded with a different color-specific, display-panel-specific, and designated-portions-specific frame for the second designated portions.

7. IMAGING SYSTEM

Figure 4:
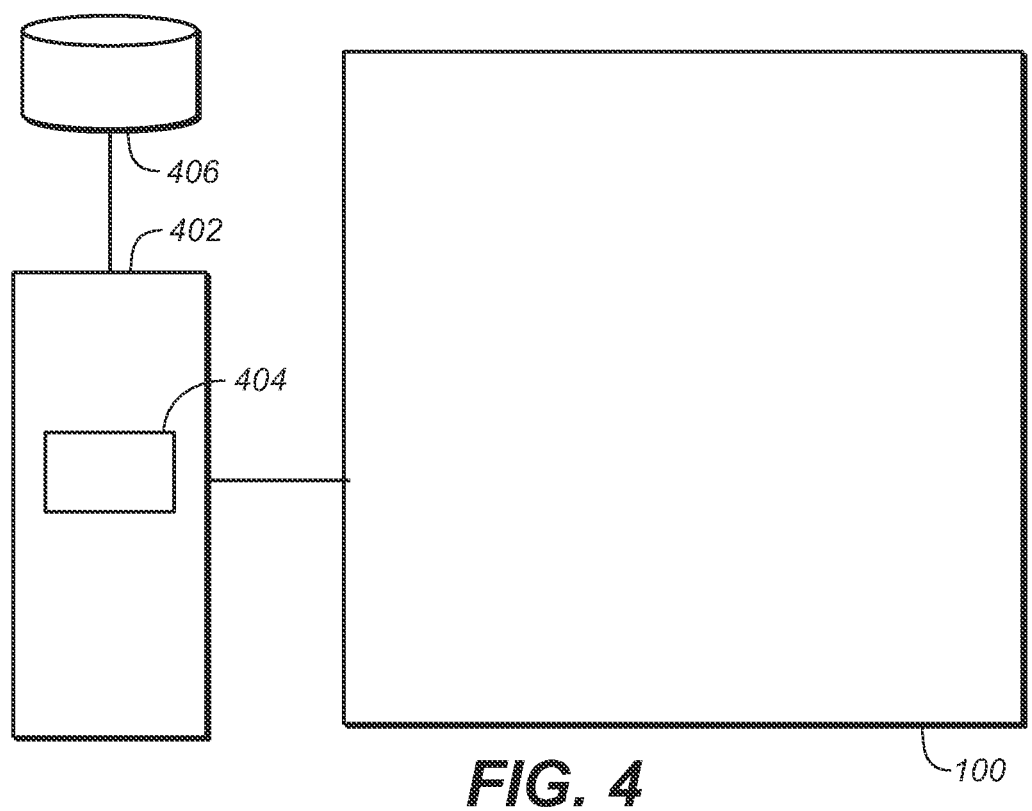
FIG. 4 illustrates an example configuration of an imaging system that comprises an imaging logic 402, in accordance with some possible embodiments of the present invention.

FIG. 4 illustrates an example configuration of an imaging system that comprises an imaging logic 402, in accordance with some possible embodiments of the present invention. In some possible embodiments, the imaging logic 402 additionally and/or optionally may comprise a light source control logic 404 configured to control the light sources and the component light sources therein. The light source control logic 402 may be operatively coupled to transmissive switching elements for the light sources. The imaging logic 402 may be operatively coupled with an image data source 406 (e.g., a set-top box, networked server, storage media or the like) and is configured to receive image data from the image data source 406. The image data may be provided by the image data source 406 in a variety of ways including from an over-the-air broadcast, or Ethernet, High-Definition Multimedia Interface (HDMI), wireless network interface, devices (e.g., set-top box, server, storage medium), etc. . . . The imaging logic 402 may be operatively coupled with a display unit (e.g., 100). Image frames received from an internal or external source may be used by the imaging logic 402 to drive the transmissive switching elements for the light sources and the component light sources therein to time-wise sequentially illuminate all or some portions of two or more display panels in the display unit (100). The image frames may also be used by the imaging logic 402 to derive pixel values in various frames in various resolutions to drive each of the two or more display panels in the display unit (100) as the display panels are illuminated with light of different colors.

8. EXAMPLE PROCESS FLOWS

Figure 5A:
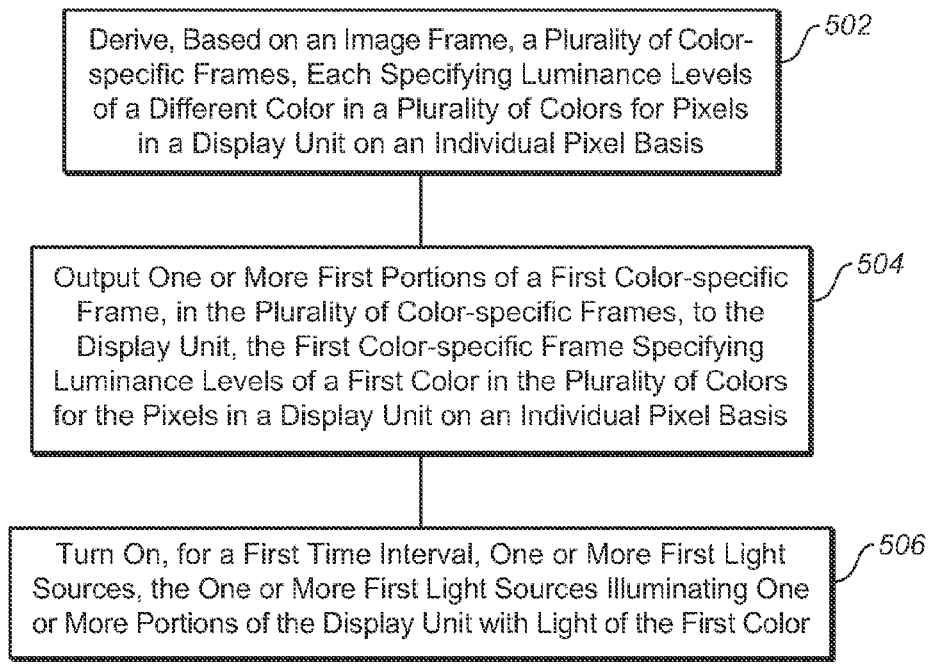
FIG. 5A and FIG. 5B illustrate example process flows, according to a possible embodiment of the present invention.

FIG. 5A illustrates an example process flow according to a possible embodiment of the present invention. In some possible embodiments, one or more computing devices or components in an imaging system with a display unit 100, or a computing device that contains an imaging system with a display unit 100, may perform this process flow. In block 502, the imaging system derives, based on an image frame, a plurality of color-specific frames. A color-specific frame herein may specify luminance levels of a different color in a plurality of colors for pixels in a display unit on an individual pixel basis. At least one of the pixels in the display unit is free of any color filter.

In block 504, the imaging system outputs at least a portion of a first color-specific frame, in the plurality of color-specific frames, to the display unit. The first color-specific frame may specify luminance levels of a first color in the plurality of colors for the pixels in a display unit on an individual pixel basis. In some possible embodiments, color specific pixel values in the first color-specific frame may be determined based on corresponding pixel values in the image frame. A color specific pixel value herein may be used to set a light transmittance level for a corresponding pixel in the display unit.

In block 506, the imaging system turns on, for a first time interval, one or more first light sources. The one or more first light sources may illuminate at least a portion of the display unit with light of the first color.

In some possible embodiments, the imaging system may output at least a portion of a second color-specific frame, in the plurality of color-specific frames, to the display unit. The second color-specific frame may specify luminance levels of a second color in the plurality of colors for the pixels in a display unit on an individual pixel basis.

In some possible embodiments, the imaging system may turn on, for a second time interval, one or more second light sources to illuminate the at least a portion of the display unit with light of the second color. The second time interval may begin after the first time interval ends.

In some possible embodiments, the imaging system may output at least a portion of a third color-specific frame, in the plurality of color-specific frames, to the display unit. The third color-specific frame may specify luminance levels of a third color in the plurality of colors for the pixels in a display unit on an individual pixel basis. In some possible embodiments, the imaging system may turn on, for a third time interval, one or more third light sources to illuminate the at least a portion of the display unit with light of the third color. The third time interval may begin after the second time interval ends. In some possible embodiments, the first time interval, the second time interval, and the third time interval may be neighboring individual illumination intervals in a sequence of illumination intervals.

In some possible embodiments, the first color, the second color and the third color may all be different. In some possible embodiments, the first color, the second color and the third color may make up a full complement of primary colors in a color space supported by the imaging system. In some possible embodiments, the imaging system may be an RGB display system. Thus, the first color, the second color, the third color, etc. may be one of red, green, blue colors. In some possible embodiments, the imaging system may not be a RGB display system, the first color, the second color, the third color, etc. may be one in a different combination of colors other than red, green, and blue colors. The imaging system may or may not be a tricolor system. More than three colors may be used in the imaging system herein. In some embodiments, the first, second and third colors may form a part, not a full complement, of a color space supported by the imaging system. In such embodiments, the imaging system may derive, based on the image frame, one or more other color-specific frames, the one or more other color-specific frames specifying luminance levels of one or more other colors for the pixels in the display unit on the individual pixel basis, the one or more other colors being different from each of the first color, the second color, and the third color; output at least one of the one or more other color-specific frames to the display unit; and turn on, for at least one of one or more other time intervals, one or more other light sources, the one or more other light sources illuminating one or more portions of the display unit with light of at least one of the one or more other colors.

In some possible embodiments, the display unit may comprise at least two monochromatic display panels. In some possible embodiments, the display unit may comprise at least one monochromatic display panel. The image process system may cause some portions in the display unit to be set to dark black while some other portions of the display unit is illuminated, possibly with light of different colors, during the same time interval.

In some possible embodiments, processes are added, one or more processes are removed, or one or more processes are provided in a different sequence than shown in FIG. 5A.

Figure 5B:
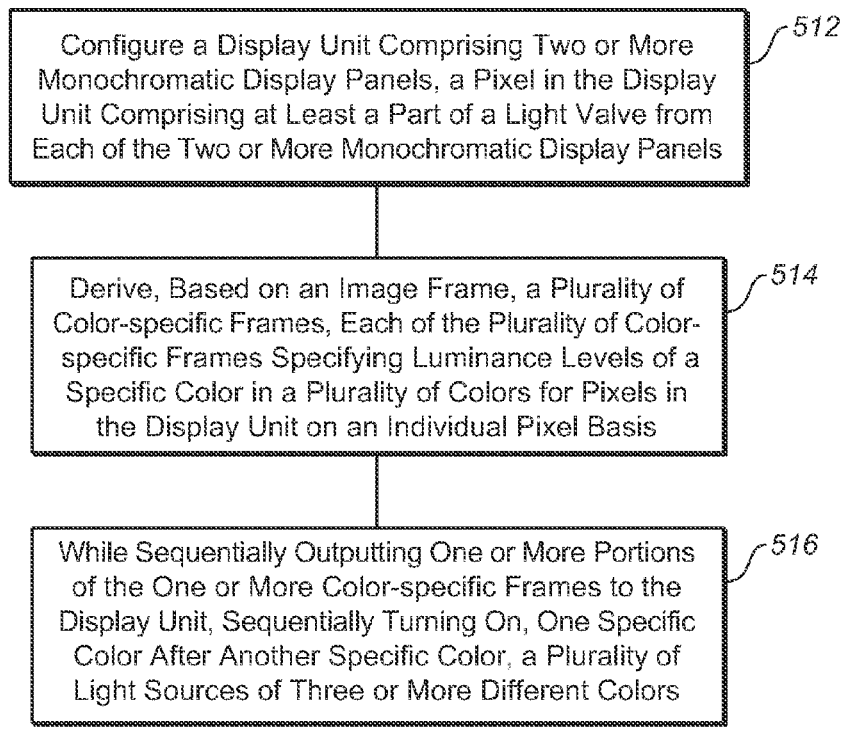

FIG. 5B illustrates an example process flow according to a possible embodiment of the present invention. In some possible embodiments, one or more computing devices or components in an imaging system with a display unit 100, or a computing device that contains an imaging system with a display unit 100, may perform this process flow. In block 512, the imaging system configures a display unit comprising two or more monochromatic display panels. A pixel in the display unit may comprise at least a part of a light valve from each of the two or more monochromatic display panels.

In block 514, the imaging system derives, based on an image frame, a plurality of color-specific frames. Each of the plurality of color-specific frames may specify luminance levels of a specific color in a plurality of colors for pixels in the display unit on an individual pixel basis.

In block 516, the imaging system sequentially turns on, while sequentially outputting one or more portions of the one or more color-specific frames to the display unit one specific color after another specific color, a plurality of light sources of three or more different colors to illuminate one or more portions of the two or more monochromatic display panels that correspond to the one or more portions of the one or more color-specific frames.

In some possible embodiments, at least two light sources in the plurality of light sources may be contained in a single light source housing. A light source contained in the single light source housing may be individually controllable.

In some possible embodiments, the display unit may comprise one or more of electronic, optical, or electro-optical components other than the two or more monochromatic display panels and the plurality of light sources of three or more different colors.

In some possible embodiments, an individual light source in the plurality of light sources of three or more different colors may illuminate a portion of the display unit according to a point spread function associated with the individual light source.

In some possible embodiments, in a time interval, the display unit comprises a first portion designated to be illuminated by the individual light source and a second portion not designated to be illuminated by the individual light source.

In some possible embodiments, the imaging system may set, while the individual light source in the plurality of light sources of three or more different colors is illuminating the first portion of the display unit, at least one of the two or more monochromatic display panels to dark black for the second portion.

In some possible embodiments, in a time interval, the display unit comprises a first portion designated to be illuminated by the individual light source with light of a specific color and a second portion designated to be illuminated by another individual light source with light of a different specific color.

In some possible embodiments, the one or more first portions illuminated with the light of the first color are same as the one or more second portions illuminated with the light of the second color. In some possible embodiments, the one or more first portions illuminated with the light of the first color are different from the second portions illuminated with the light of the second color. The first color (e.g., red) may be same as the second color. The one or more first light sources may be same as the one or more second light sources. The display unit may comprise at least one monochromatic display panel. In some possible embodiments, the at least one monochromatic display panel may cause the one or more second portions in the display unit to be set to dark black for the first time interval. Additionally and/or optionally, in some possible embodiments, the at least one monochromatic display panel causes the one or more first portions in the display unit to be set to dark black for the second time interval.

In some possible embodiments, the one or more first portions illuminated with the light of the first color are same as the one or more second portions illuminated with the light of the second color. The one or more first portions in the display unit may or may not be illuminated after the first time interval and before the second time interval.

In some possible embodiments, processes are added, one or more processes are removed, or one or more processes are provided in a different sequence than shown in FIG. 5B.

9. IMPLEMENTATION MECHANISMS

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
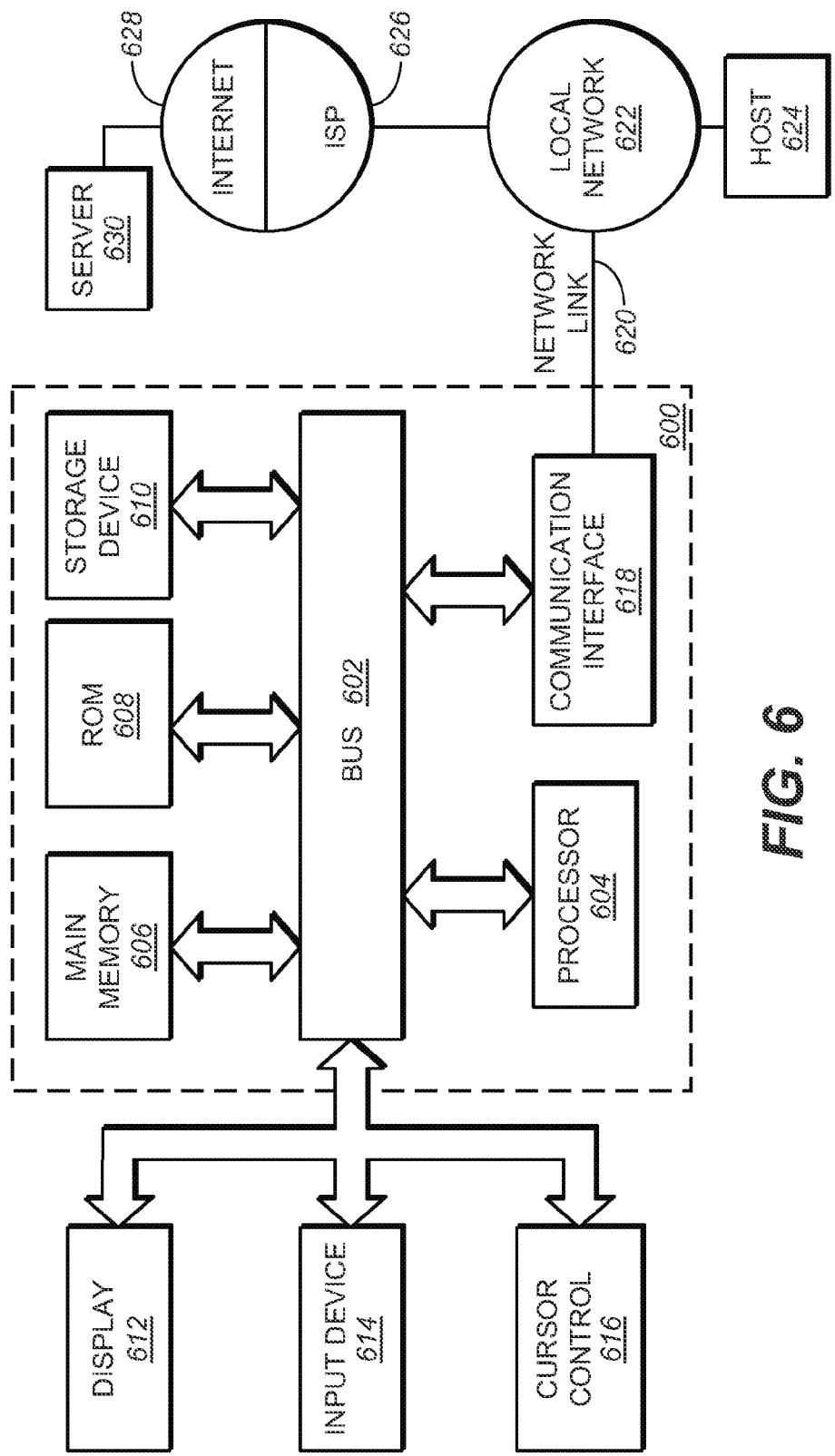
FIG. 6 illustrates an example hardware platform on which a computer or a computing device as described herein may be implemented, according a possible embodiment of the present invention.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

10. EQUIVALENTS, EXTENSIONS, ALTERNATIVES AND MISCELLANEOUS

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Additionally and/or optionally, in some possible embodiments, quantum dots may be used to replace color filters and significantly increase the light transmittance efficiency because the quantum dots do not act as a passive light filter but are light regenerators. Photons through a light valve (e.g., LCD) layer hit the quantum dots, which in turn generate the appropriate color rather than filter away light wavelength outside a wavelength range at a loss of light transmittance efficiency. Consequently, using quantum dots in this manner may yield a brighter display with wide color gamut.

Additionally and/or optionally, in some possible embodiments, a first black-and-white light valve (e.g., LCD) layer may be right in front of one or more LEDs (e.g., blue). The light valve layer modulates the amount of light at a first level illuminated on a quantum dot layer. The quantum dot layer may be followed by one or more other optical layers and then the final light valve (e.g., LCD) layer. This optical configuration may be configured to adapt in an optimal way to give the best light output and image quality. Furthermore, light sources with quantum dots as described herein may support two or more display panels in any order. For example, a black-and-white display panel may be before or after a color display panel. Additionally and/or optionally, a high transmission display panel may be before or after a low transmission display panel. A light source herein may be used in a system that uses various types of display panels. In an example, a display panel may be based on electrowetting, plasma, front projection, liquid crystal, etc. Liquid crystal display panels may comprise light valves that use various types of liquid crystal materials, organic (e.g., cholesterol), inorganic, lyotropic liquid crystals, electrically controlled birefringence (ECB) liquid crystals, etc.

Additionally and/or optionally, in some possible embodiments, a light source with different types of LEDs and different types of quantum dots may be used in a display system herein. For example, in some possible embodiments, two types of LEDs may be used. Blue LEDs or first frequency LEDs may be used to regenerate blue quantum dot frequency light and red quantum dot frequency light. Optionally and/or alternatively, a part of the blue LED light may be directly passed through to illuminate a target such as a diffuser or a display panel, while the remaining part of the blue LED light may be used to regenerate the red quantum dot frequency light. Additionally and/or optionally, green LEDs or second frequency LEDs may be used to regenerate green quantum dot frequency light. Optionally and/or alternatively, the green LED light may be directly passed through to illuminate a target such as a diffuser or a display panel. In some possible embodiments, techniques as described herein may modulate and/or control blue and red light as a first set of light, and modulate and/or control green light separately as a second set of light, thereby eliminating possible overlap between these two sets of light that would exists should light of blue, green, and red be modulated and controlled together. In some possible embodiments, some color filters have broad spectral filtering. In some display systems, the red color filters may overlap with the green filter and the green filter may overlap with the blue filter. However the red filter and the blue filter may not overlap. In some possible embodiments, in these display systems, illuminating with one frame of red light and blue light and with a subsequent frame of green light may reduce the color bleeding because of the spectral overlaps and may provide a wider color gamut. In some possible embodiments, the spectral profile for blue light and red light may be moved away from a middle spectral area designated for green light. A light source with quantum dots may be used in these embodiments to provide relatively accurate placement or designation of wavelength ranges for light of primary colors (e.g., red, blue and green in a RGB system).

What is claimed is:

1. A method comprising:
   deriving, based on an image frame, a plurality of color-specific frames, each specifying luminance levels of a different color in a plurality of colors for pixels in a display unit on an individual pixel basis;
   outputting one or more first portions of a first color-specific frame, in the plurality of color-specific frames, to the display unit, the first color-specific frame specifying luminance levels of a first color in the plurality of colors for the pixels in a display unit on an individual pixel basis; and
   turning on, for a first time interval, one or more first light sources, the one or more first light sources illuminating one or more first portions of the display unit with light of the first color;
   wherein each pixel of the display unit comprising at least a part of a black-and-white light valve from two or more stacked monochromatic liquid crystal display panels, and
   wherein the method is performed by one or more computing devices.

2. The method of claim 1, further comprising:
   outputting one or more second portions of a second color-specific frame, in the plurality of color-specific frames, to the display unit, the second color-specific frame specifying luminance levels of a second color in the plurality of colors for the pixels in a display unit on an individual pixel basis; and
   turning on, for a second time interval, one or more second light sources, the one or more second light sources illuminating one or more second portions of the display unit with light of the second color.

3. The method of claim 2, wherein the second color is different from the first color, wherein the one or more first portions of the display unit do not overlap with the one or more second portions of the display unit, and wherein the at least wherein the second time interval is the same as the first interval.

4. The method of claim 2, wherein the one or more first portions of the display unit are separated from the one or more second portions of the display unit by one or more portions of the display unit, and wherein the one or more portions are set to dark black in the first interval.

5. The method of claim 1, wherein the one or more first portions of the display unit are the same as the one or more second portions of the display unit, and wherein the second time interval begins after the first time interval ends.

6. The method of claim 1, further comprising:
outputting one or more portions of a second color-specific frame, in the plurality of color-specific frames, to the display unit, the second color-specific frame specifying luminance levels of a second color in the plurality of colors for the pixels in a display unit on an individual pixel basis; and
turning on, for a second time interval, one or more second light sources, the one or more second light sources illuminating the one or more first portions of the display unit with light of the second color;
outputting at least a portion of a third color-specific frame, in the plurality of color-specific frames, to the display unit, the third color-specific frame specifying luminance levels of a third color in the plurality of colors for the pixels in a display unit on an individual pixel basis; and
turning on, for a third time interval, one or more third light sources, the one or more third light sources illuminating the one or more first portions of the display unit with light of the third color;
wherein the second time interval begins after the first time interval ends;
wherein the third time interval begins after the second time interval ends.

7. The method of claim 6, wherein the second color is different from each of the first color and the third color.

8. The method of claim 6, wherein each of the first color, the second color, and the third color is different from one another; the method further comprising:
deriving, based on the image frame, one or more other color-specific frames, the one or more other color-specific frames specifying luminance levels of one or more other colors for the pixels in the display unit on the individual pixel basis, the one or more other colors being different from each of the first color, the second color, and the third color;
outputting at least one of the one or more other color-specific frames to the display unit;
turning on, for at least one of one or more other time intervals, one or more other light sources, the one or more other light sources illuminating one or more portions of the display unit with light of at least one of the one or more other colors.

9. The method of claim 6, wherein the first time interval, the second time interval, and the third time interval are neighboring individual illumination intervals in a sequence of illumination intervals.

10. The method of claim 1, wherein at least one color specific pixel value in the first color-specific frame is determined based on a corresponding pixel value in the image frame; and wherein the at least one color specific pixel value is used to set a light transmittance level for a corresponding pixel in the display unit.

11. The method of claim 1 wherein at least one monochromatic liquid crystal display panel of the two or more stacked monochromatic liquid crystal display panels causes at least another portion in the display unit to be set to dark black while the at least a portion of the display unit is illuminated during the first time interval.

12. An apparatus comprising a processor and configured to perform the method recited in claim 1.

13. The method of claim 1 wherein the one or more first light sources illuminating the one or more first portions of the display unit comprises quantum dots.

14. The method of claim 1 wherein the two or more stacked monochromatic liquid crystal display panels differ in spatial resolution.

15. A method comprising:
configuring a display unit comprising two or more monochromatic liquid crystal display panels, a pixel in the display unit comprising at least a part of a black-and-white light valve from each of the two or more monochromatic liquid crystal display panels;
deriving, based on an image frame, a plurality of color-specific frames, each of the plurality of color-specific frames specifying luminance levels of a specific color in a plurality of colors for pixels in the display unit on an individual pixel basis;
while sequentially outputting one or more portions of the one or more color-specific frames to one or more portions of the display unit, sequentially turning on, one specific color after another specific color, a subset of light sources in a plurality of light sources of three or more different colors to illuminate one or more portions of the two or more monochromatic liquid crystal display panels that correspond to the one or more portions of the one or more color-specific frames.

16. The method of claim 15, wherein at least two light sources in the plurality of light sources are contained in a single light source housing; and wherein each light source contained in the single light source housing is individually controllable.

17. The method of claim 15, wherein the display unit comprises one or more of electronic, optical, or electro-optical components other than the two or more monochromatic liquid crystal display panels and the plurality of light sources of three or more different colors.

18. The method of claim 15, wherein an individual light source in the plurality of light sources of three or more different colors illuminates a portion of the display unit according to a point spread function associated with the individual light source.

19. The method of claim 18, wherein, in a time interval, the display unit comprises a first portion designated to be illuminated by the individual light source and a second portion not designated to be illuminated by the individual light source.

20. The method of claim 19, further comprising setting, while the individual light source in the plurality of light sources of three or more different colors is illuminating the first portion of the display unit, at least one of the two or more monochromatic liquid crystal display panels to dark black for the second portion.

21. The method of claim 18, wherein, in a time interval, the display unit comprises a first portion designated to be illuminated by the individual light source with light of a specific color and a second portion designated to be illuminated by another individual light source with light of a different specific color.

22. The imaging system of claim 19, wherein an individual light source in the plurality of light sources of three or more different colors is configured to illuminate a portion of the display unit according to a point spread function associated with the individual light source.

23. The imaging system of claim 22, wherein, in a time interval, the display unit comprises a first portion designated to be illuminated by the individual light source and a second portion not designated to be illuminated by the individual light source.

24. The imaging system of claim 23, wherein the imaging controller is further configured to perform, while the individual light source in the plurality of light sources of three or more different colors is illuminating the portion of the display unit, at least one of the two or more monochromatic liquid crystal display panels is set to dark black for the second sub portion.

25. The method of claim 15 wherein the subset of light sources comprises quantum dots.

26. An imaging system, comprising:
a display unit comprising two or more monochromatic liquid crystal display panels, a pixel in the display unit comprising at least a part of a black-and-white light valve from each of the two or more stacked monochromatic liquid crystal display panels;
a plurality of light sources of one or more different colors;
an imaging controller configured to interface with, and control operations of, the display unit and the plurality of light sources of one or more different colors, to receive one or more image frames to be displayed on the display unit, and to perform:
deriving, based on an image frame, a plurality of color-specific frames, each of the plurality of color-specific frames specifying luminance levels of a specific color in a plurality of colors for pixels in the display unit on an individual pixel basis;
while sequentially outputting one or more portions of the one or more color-specific frames to the display unit, sequentially turning on, one specific color after another specific color, a plurality of light sources of three or more different colors to illuminate one or more portions of the two or more monochromatic display panels that correspond to the one or more portions of the one or more color-specific frames.

27. The imaging system of claim 26, wherein at least two light sources in the plurality of light sources are contained in a single light source housing; and wherein each light source contained in the single light source housing is individually controllable.

28. The imaging system of claim 26, wherein the display unit comprises one or more of electronic, optical, or electro-optical components other than the two or more monochromatic liquid crystal display panels and the plurality of light sources of three or more different colors.

29. The imaging system of claim 26 wherein the plurality of light sources of one or more different colors comprises quantum dots.

30. The imaging system of claim 26 wherein the two or more stacked monochromatic liquid crystal display panels differ in spatial resolution.

* * * * *